United States Patent
Gutierrez et al.

[11] Patent Number: 6,007,346
[45] Date of Patent: Dec. 28, 1999

[54] EIGHT-WAY TRACTOR AND TRAILER ELECTRICAL COUPLING SYSTEM

[76] Inventors: Alejandro Gutierrez; Abel Gutierrez, Jr., both of 201 S. 5th St., McAllen, Tex. 87501

[21] Appl. No.: 08/971,756

[22] Filed: Nov. 17, 1997

Related U.S. Application Data

[60] Provisional application No. 60/046,574, May 15, 1997.

[51] Int. Cl.[6] .................................................. H01R 33/00
[52] U.S. Cl. ............................................................ 439/35
[58] Field of Search ..................... 439/35, 651; 280/422, 280/420

[56] References Cited

U.S. PATENT DOCUMENTS

| | | | |
|---|---|---|---|
| 2,660,679 | 11/1953 | Hunt | 307/10.1 |
| 4,061,407 | 12/1977 | Snow | 439/35 |
| 4,460,811 | 7/1984 | Murr | 200/51.03 |
| 4,770,644 | 9/1988 | Feder | 439/166 |
| 4,781,393 | 11/1988 | Jeter | 307/10.1 |
| 4,792,308 | 12/1988 | Johnson | 439/35 |
| 4,842,532 | 6/1989 | Krause | 439/174 |
| 4,846,697 | 7/1989 | Rodgers | 439/35 |
| 5,080,594 | 1/1992 | Swinford | 439/35 |
| 5,385,476 | 1/1995 | Jasper | 439/38 |
| 5,443,389 | 8/1995 | Hughes | 439/35 |
| 5,514,009 | 5/1996 | Hughes | 439/35 |
| 5,516,136 | 5/1996 | Matthews | 280/422 |
| 5,549,478 | 8/1996 | McGuire | 439/35 |
| 5,766,020 | 2/1996 | Hughes | 439/35 |

FOREIGN PATENT DOCUMENTS

| | | |
|---|---|---|
| 610681A | 8/1994 | European Pat. Off. . |
| 3904522 | 8/1990 | Germany . |
| 2039165 | 7/1980 | United Kingdom . |
| 2272799 | 5/1994 | United Kingdom . |

*Primary Examiner*—Neil Abrams
*Assistant Examiner*—Javaid Nasri
*Attorney, Agent, or Firm*—Richard C. Litman

[57] ABSTRACT

An eight way electrical coupling system for electrically interconnecting a tractor and a trailer. The electrical coupling system includes a wiring harness between tractor and trailer vehicles having base plates with eight pronged electrical connections each including a central electrical male terminal surrounded by seven radially disposed equidistant electrical male terminals arranged in a circular configuration. An adapter is also described for electrically interconnecting an electrical wiring harness, having seven or eight wires between tractor, and trailer base plates, having seven or eight pronged electrical connections.

6 Claims, 6 Drawing Sheets

EIGHT-WAY TRACTOR AND TRAILER ELECTRICAL COUPLING SYSTEM

CROSS REFERENCE TO RELATED APPLICATIONS

This application claims the benefit of U.S. Provisional Application Ser. No. 60/046,574 filed May 15, 1997.

BACKGROUND OF THE INVENTION

1. FIELD OF THE INVENTION

The present invention relates to electrical couplings between the wiring systems of tractor and trailer vehicles.

2. DESCRIPTION OF RELATED ART

When technology advances in an area where electrical power is used, the electrical power demands of that field often also increase. For example, lighting demands in the trucking industry have been steadily rising. The increased demand for lighting on a tractor vehicle and a trailer vehicle causes a concomitant increase in demand on the electrical power of the towing vehicle. However, because electrical circuits have a power handling capacity, as the electrical power demands of an electrical circuit are increased, the risk of exceeding the power capacity of that circuit grows. Thus, there is a potential problem with the power handling capacity of the electrical circuits between tractor and trailer vehicles being exceeded.

Such demands have caused the standard configuration of electrical connectors for use between tractor and trailer vehicles to change a few times. When six electrical terminals became a standard in the trucking industry, the typical wiring harnesses between tractor and trailer vehicles became arranged in a circular configuration because a circular configuration conserves space for electrical harnesses containing six or more terminals. The current standard electrical connection for electrical harnesses connecting tractor and trailer vehicles in the trucking industry is a connection consisting of a central electrical terminal (for attachment of auxiliary electrical components) surrounded by six radially disposed equidistant electrical terminals forming a circle, i.e. a "seven-way" connection.

The following U.S. Patents each show connections for the current standard seven-way electrical connection: U.S. Pat. No. 4,061,407, issued to John P. Snow on Dec. 6, 1977; U.S. Pat. No. 4,770,644, issued to Emil Feder on Sep. 13, 1988; U.S. Pat. No. 4,792,308, issued to Raymond L. Johnson on Dec. 20, 1988; U.S. Pat. No. 5,080,594, issued to Stephen W. Swinford on Jan. 14, 1992; U.S. Pat. No. 5,385,476, issued to Kenneth O. Jasper on Jan. 31, 1995; U.S. Pat. No. 5,514,009, issued to Michael T. Hughes on May 7, 1996; and U.S. Pat. No. 5,516,136, issued to Peter L. Matthews et al. on May 14, 1996.

As noted, the number of terminals in the standard seven-way connection for a wiring harness electrically interconnecting the electrical systems of tractor and trailer vehicles has increased over time. The following patents show electrical connections for electrical wiring harnesses electrically interconnecting tractor and trailer vehicles in the trucking industry different from those of the current standard: U.S. Pat. No. 2,660,679, issued to Arthur E. Hunt on Nov. 24, 1953; U.S. Pat. No. 4,460,811, issued to Paul G. Murr et al. on Jul. 17, 1984; U.S. Pat. No. 4,781,393, issued to C. Duane Jeter on Nov. 1, 1988; U.S. Pat. No. 4,842,532, issued to Jeffrey J. Krause on Jun. 27, 1989; U.S. Pat. No. 5,443,389, issued to Michael T. Hughes on Aug. 22, 1995; German Patent Number 3,904,522, published on Aug. 16, 1990; and European Patent Number 610,681, published on Aug. 17, 1994.

Furthermore, changes in the standard connection for a wiring harness electrically interconnecting the electrical systems of tractor and trailer vehicles take place gradually, because tractor and trailer vehicles which were complementarily constructed and compatible with a previous standard remain on the road for many years after a change occurs in the manufacturing standard. Thus, because tractors and trailers are intended to be used interchangeably, the need for adapters capable of electrically interconnecting otherwise incompatible electrical connections arise as new lighting devices, or other electrically operated devices, are added to one or the other. The following U.S. Patents show adapters capable of electrically interconnecting otherwise incompatible electrical connections between tractor and trailer vehicles: Hughes '389, Hughes '009, Jeter '393, and Krause '532.

However, none of the above inventions and patents show an electrical wiring harness having an eight pronged electrical connection consisting of a central auxiliary terminal surrounded by seven radially disposed equidistant terminals arranged in a circular configuration for use between tractor and trailer vehicles having a standard seven-way connection. Likewise, none of the above inventions and patents show an adapter capable of electrically interconnecting the current standard configuration of electrical terminals in a wiring harness between tractor and trailer vehicles with an eight pronged electrical connection consisting of a central auxiliary terminal surrounded by seven radially disposed equidistant terminals arranged in a circular configuration. Thus, none of the above inventions and patents, taken either singularly or in combination, is seen to describe the instant invention as claimed. Therefore, an eight-way electrical coupling system for tractor and trailer vehicles solving the aforementioned problems is desired.

SUMMARY OF THE INVENTION

The invention is an eight way tractor and trailer electrical coupling system for electrically interconnecting tractors and trailers having eight electrical terminal connections. The eight way tractor and trailer electrical coupling system includes an eight way electrical base plate on a tractor, an eight way electrical base plate on a trailer and an electrical wiring harness with eight wires to electrically interconnect the eight way electrical base plates on the tractor and the trailer. The electrical base plates each have an eight pronged electrical terminal connection. The eight pronged electrical terminal connections each include a central male electrical terminal surrounded by seven radially disposed equidistant male electrical terminals arranged in a circular configuration. The electrical wiring harness includes two ends each including eight female electrical terminals. The eight female electrical terminals include a central female electrical terminal surrounded by seven radially disposed equidistant female electrical terminals arranged in a circular configuration.

An adapter is also described that is capable of electrically interconnecting an electrical wiring harness having seven or eight wires to an electrical terminal connection having seven or eight male electrical terminals. One embodiment of the adapter has an eight way female receptacle for connection to an eight way electrical base plate and a seven way male prong connection for receiving an end of a seven wire electrical wiring harness. A second embodiment of the adapter has a seven way female receptacle for connection to a standard seven way electrical base plate and an eight way male prong connection for receiving a female end of an eight wire electrical wiring harness. Standard seven way electrical base plates include a central male electrical terminal surrounded by six radially disposed equidistant male electrical terminals arranged in a circular configuration.

Accordingly, it is a principal object of the invention to provide an eight way electrical coupling system for electrically interconnecting a tractor vehicle and a trailer vehicle to distribute the power load of electrical circuits between the tractor and trailer vehicles.

It is another object of the invention to provide an adapter for electrically interconnecting a seven or eight electrical terminal tractor or trailer base plate with an electrical wiring harness having seven or eight wires.

It is an object of the invention to provide improved elements and arrangements thereof in an eight way tractor and trailer electrical coupling system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
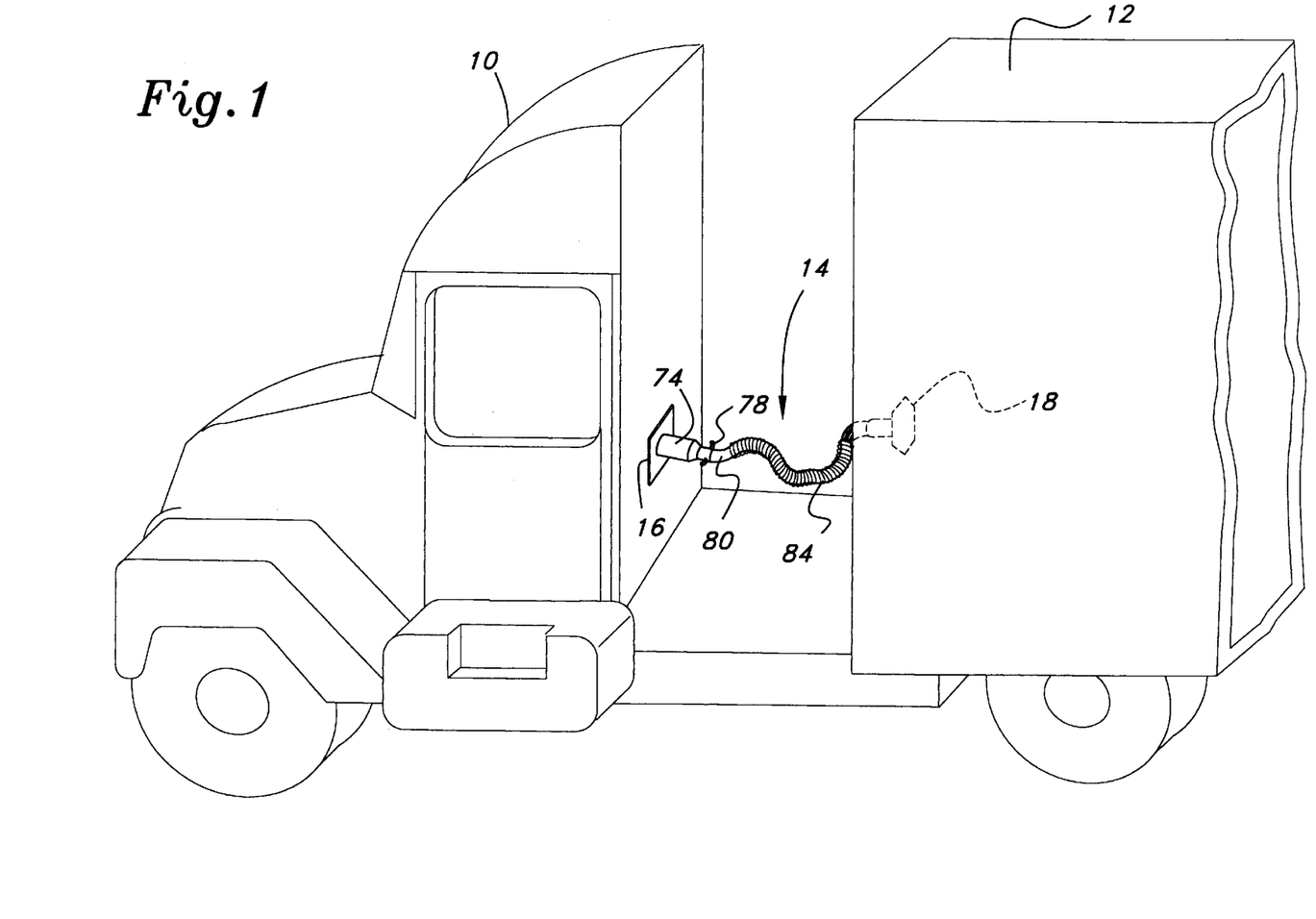
FIG. 1 is an environmental, perspective view of an eight way tractor and trailer electrical coupling system according to the present invention.
Figure 2:
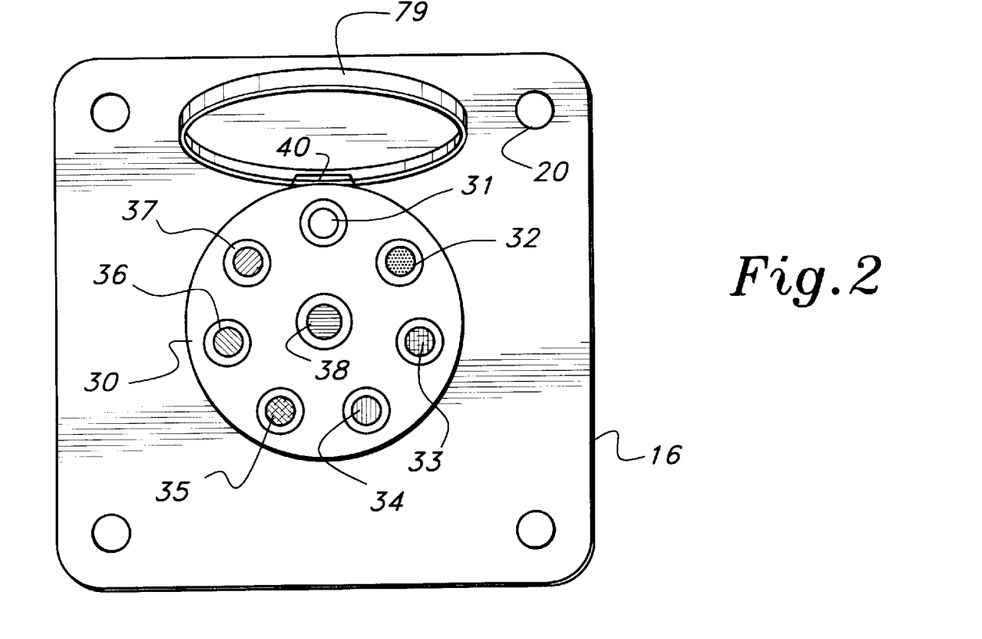
FIG. 2 is a front view of the tractor vehicle electrical connections showing the weather cover open.
Figure 3:
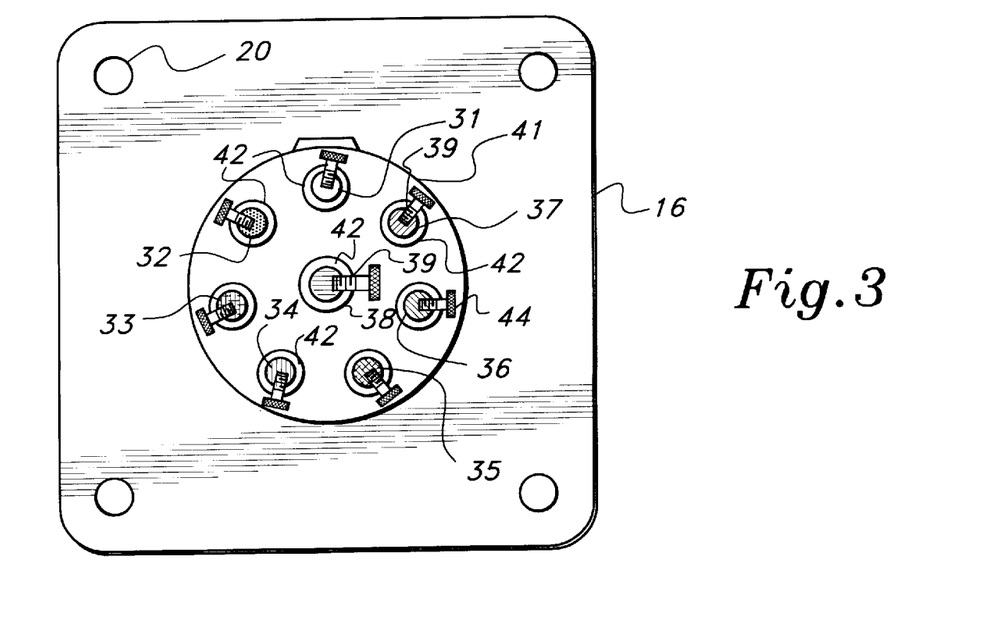
FIG. 3 is a rear view of the tractor vehicle electrical connections shown in FIG. 2.
Figure 4:
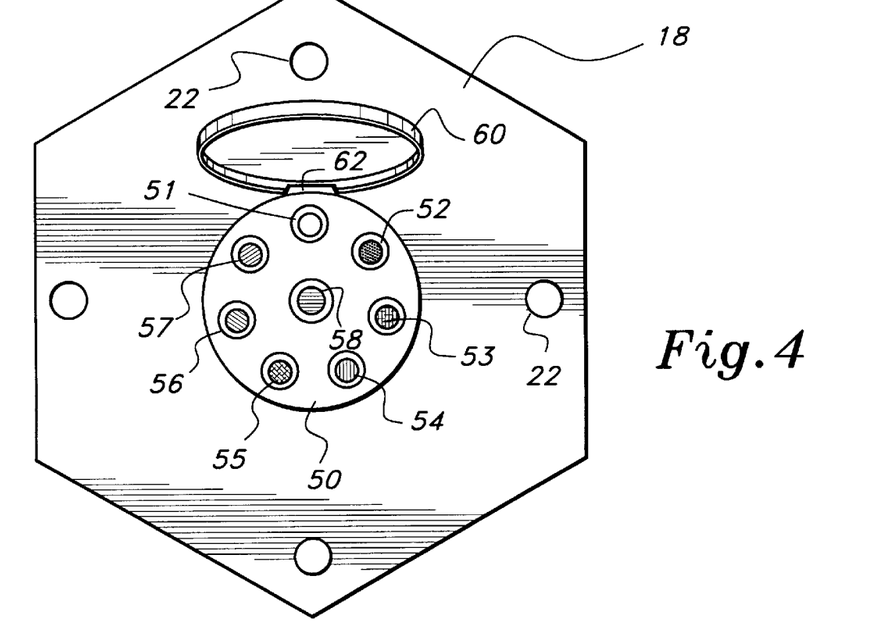
FIG. 4 is a front view of the trailer vehicle electrical connections showing the weather cover open.
Figure 5:
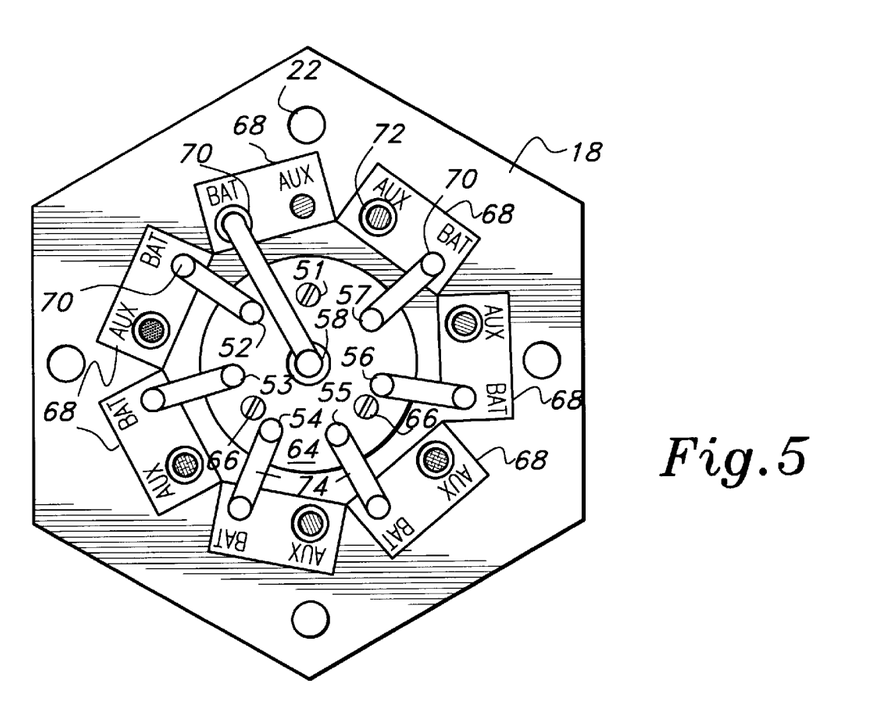
FIG. 5 is a rear view of the trailer vehicle electrical connections shown in FIG. 5.

Referring to the drawings, FIG. 1 shows an eight way tractor and trailer electrical coupling system for electrically interconnecting tractors and trailers having eight way electrical terminal connections according to the invention installed between a tractor 10 and a trailer 12 common to the trucking industry. An electrical wiring harness 14 having opposing ends is shown having one end connected to the center of a tractor base plate 16 which is mounted in the rear of the tractor 10. The other end of the wiring harness 14 is connected to the center of a trailer base plate 18 which is mounted in the front of the trailer 12. The tractor base plate 16, as shown in FIGS. 2 and 3, is grounded and provides a supporting structure upon which each of a plurality of male electrical terminals 31–38 are provided for attachment to the rear wall of the tractor 10; similarly, the trailer base plate 18, as shown in FIGS. 4 and 5, is grounded and provides a supporting structure upon which each of a plurality of male electrical terminal 51–58 for attachment to the front wall of the trailer 12. The wiring harness 14 is connected therebetween having the appropriately shaped connectors to mate with the circular terminals of the base plates.

In FIGS. 1 through 5 the tractor base plate 16 is shown in the form of a square and the trailer base plate 18 is shown in the form of a hexagon in order both to clearly visually differentiate the tractor and trailer base plates and to illustrate two preferred shapes. The tractor base plate 16 and the trailer base plate 18 are electrically conductive plates secured, respectively, to the rear wall of the tractor 10 and the front wall of the trailer 12 by bolts (not shown) through bolt holes 20 and 22 in order to provide grounded contact between the plates and the body of the vehicle. The particular shape of the tractor base plate 16 and the trailer base plate 18 may be modified as necessary to accommodate standard tractor rear walls and trailer front walls.

The tractor base plate 16 is shown from front and rear views in FIGS. 2 and 3. As shown in FIG. 2 the front of the tractor base plate 16 includes a connection member 30 mounted in the center. FIG. 3 shows the rear side of the tractor base plate 16 and the connection member 30, normally hidden from view by the body of the tractor. The tractor base plate 16 secures an 8-way connection member 30. The eight way connection member 30 is made up of an insulative-material (e.g., Bakelite) base and includes eight male electrical terminals 31–38. A central electrical terminal 38 is surrounded radially by seven electrical terminals 31–37 for conducting electricity. All eight terminals 31–38 are color coded. Color coding is extremely beneficial because controls manipulated by a driver in the tractor can be correctly connected to the electrical systems in the trailer to which they correspond. If the wiring harness 14 is connected incorrectly, a driver in the tractor 10 who turns on a Left turn blinker might energize a right turn blinker on the trailer 12 instead. Color coding the electrical connections significantly reduces the chance of inadvertently misconnecting the wiring harness 14.

Starting clockwise from the top of the eight way connection member 30 as shown in FIG. 2, pictured are a white terminal 31, a black terminal 32, a yellow terminal 33, a red terminal 34, an orange terminal 35, a green terminal 36, and a brown terminal 37, all surrounding a central, blue terminal 38. A weather cover 79 is also shown, which is pivotally attached to the tractor base plate 16 by a spring-loaded hinge (not shown). When the wiring harness 14 is connected to the eight-way connection member 30, then the weather cover 79 will be in the open position shown. When the wiring harness 14 is not connected to the eight-way connection member 30, such as when the tractor 10 is not in use, then the weather cover 79 will be lowered, automatically, by the spring loaded hinge. The weather cover 79 protects the eight-way connection member 30 from fouling due to precipitation, dust, debris, and moisture. In the open position as shown in FIG. 2, a socket guide receiver 40 is provided for aligning and properly receiving a corresponding socket guide present on the harness 14.

FIG. 3 shows the electrical terminal connections 31–38 from the rear of the base plate 16, with set screws 44 passing through each cylindrical port 42 for receiving an electrical connection and leading to a tractor power source or power source switch. When an electrical cable (not shown) leading from the tractor battery is connected to the eight way connection member 30, the set screws 44 are tightened against the respective individual cable wires (not shown) to connect the cable to the eight way connection member 30.

The trailer base plate 18 is shown in respective front and rear views in FIGS. 4 and 5. The trailer base plate 18 also secures an eight way connection member 50. The eight way connection member 50 is made up of an insulative-material (e.g., Bakelite) base and eight male electrical terminals 51–58. A central electrical terminal 58 is surrounded radially by seven electrical terminals 51–57 for conducting electricity. All eight electrical terminals 51–58 of the trailer base plate 18 are color coded in the same manner as described for the electrical terminals 31–38 on the tractor base plate 16. Color coding the electrical connections significantly reduces the chance of inadvertently misconnecting the wiring harness 14.

Starting clockwise from the top of the eight way connection member 50 as shown in FIG. 4, pictured are a white terminal 51, a black terminal 52, a yellow terminal 53, a red terminal 54, an orange terminal 55, a green terminal 56, and a brown terminal 57, all surrounding a central, blue terminal 58. A weather cover 60 is also shown, which is pivotally attached to the trailer base plate 18 by a spring-loaded hinge (not shown). When the wiring harness 14 is connected to the eight-way connection member 50, then the weather cover 60 will be in the open position shown. When the wiring harness 14 is not connected to the eight-way connection member 50, such as when the trailer 12 is not in use, then the weather cover 60 will be lowered, automatically, by the spring loaded hinge. The weather cover 60 protects the eight-way connection member 50 from fouling due to precipitation, dust, debris, and moisture. In the open position as shown in FIG. 4, a socket guide receiver 62 is provided for aligning and properly receiving a corresponding socket guide present on the harness 14.

FIG. 5 shows the terminals 51–58 from the rear of the trailer base plate 18, also mounting a plurality of hot battery leads 70 through which electrical terminals 52–58 are each connected by an electrical conductor 74. An insulator 64 held to base plate 18 by screws 66 is provided to insulatively space the terminals 52–58 from the grounded base plate 18. The white terminal 51 is electrically and conductively connected by a screw to base plate 18, thereby being ground. Circuit breakers 68 are further provided down current for each electrical circuit formed by a battery lead 70 (labelled BAT), an electrical conductor 68 and one of the electrical terminals 52–57, as clearly seen in FIG. 5. Twelve volt, thirty amp circuit breakers are recommended for the trucking industry, but others are also acceptable to accommodate other current requirements. Each lighting or other electrical system is then connected down current at the appropriately color coded auxiliary port 72 (labelled AUX).

Figure 6:
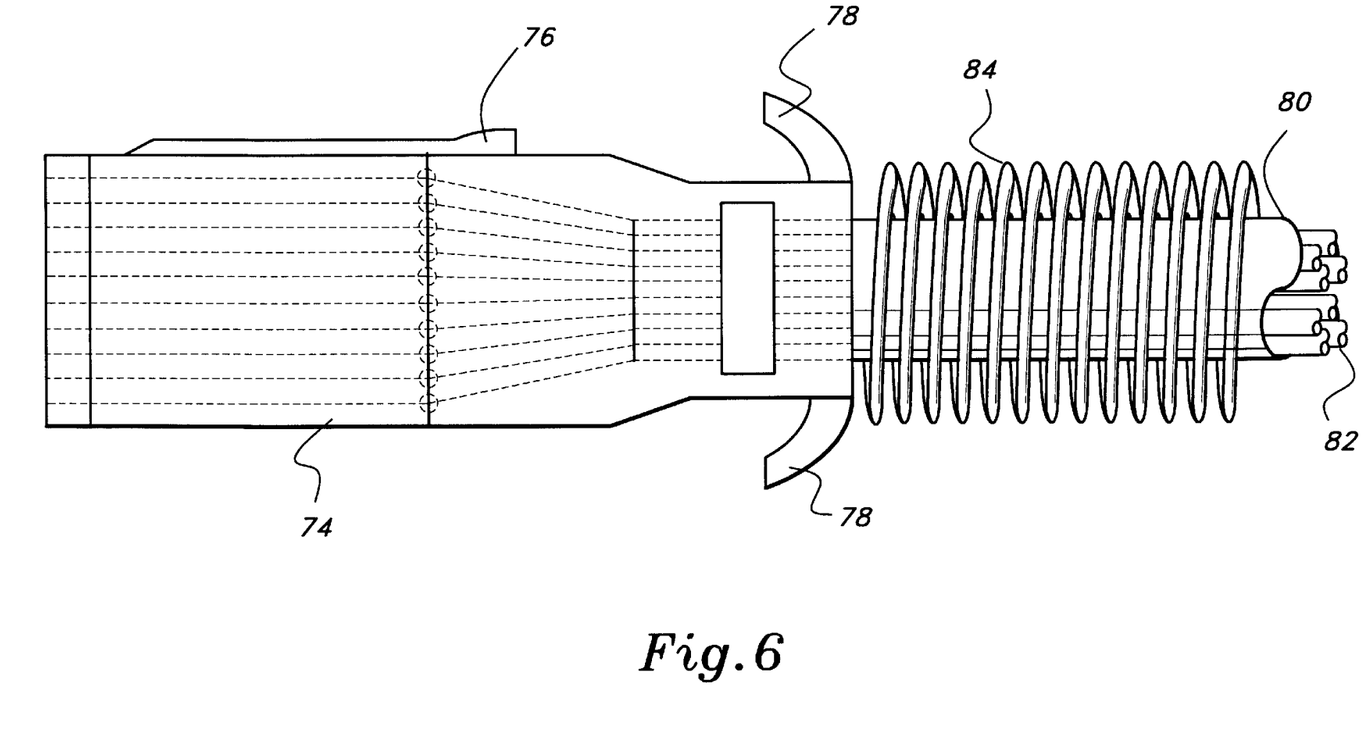
FIG. 6 is a diagrammatic and partially fragmented side view of the electrical harness connection.

Referring now to FIG. 6, a female plug for connecting to either the male-pronged tractor base plate 16 or trailer base plate 18 is shown. The female plug includes a housing 74 with a socket guide 76 and finger taps 78. The female plug is configured to align with and receive each of either the male terminals 31–38 from the tractor base plate 16 or the male terminals 51–58 from the trailer base plate 18. The socket guide 76 slides into either the socket guide receiver 40 in the tractor base plate 16 or the socket guide receiver 62 in the trailer base plate 18 to prevent misalignment of wiring completed by the harness for a proper electrical circuit from the tractor 10 to the trailer 12.

The housing 74 is fixably attached to a cable 80 at one end and forms a female plug at the opposing end. Within the cable 80 are eight separate wires 82. When the wiring harness 14 is connected to the terminals 31–38 in the eight way connection of the tractor base plate 16 and/or terminals 51–58 in the eight way connection of the trailer base plate 18, then each wire 82 electrically connects a color coded terminal with its corresponding electrical circuit. A flex spring 84 surrounds the cable for added support. This arrangement enables the wiring harness 14 between the tractor 10 and the trailer 12 to bend and flex, and expand and contract, when the tractor 10 and trailer 12 are turning. Finger taps 78 are provided to achieve greater leverage when removing the wiring harness 14 from either the tractor base plate 16 or the trailer base plate 18. Each end of the wiring harness 14 is provided with an identical female receptacle.

Figure 7:
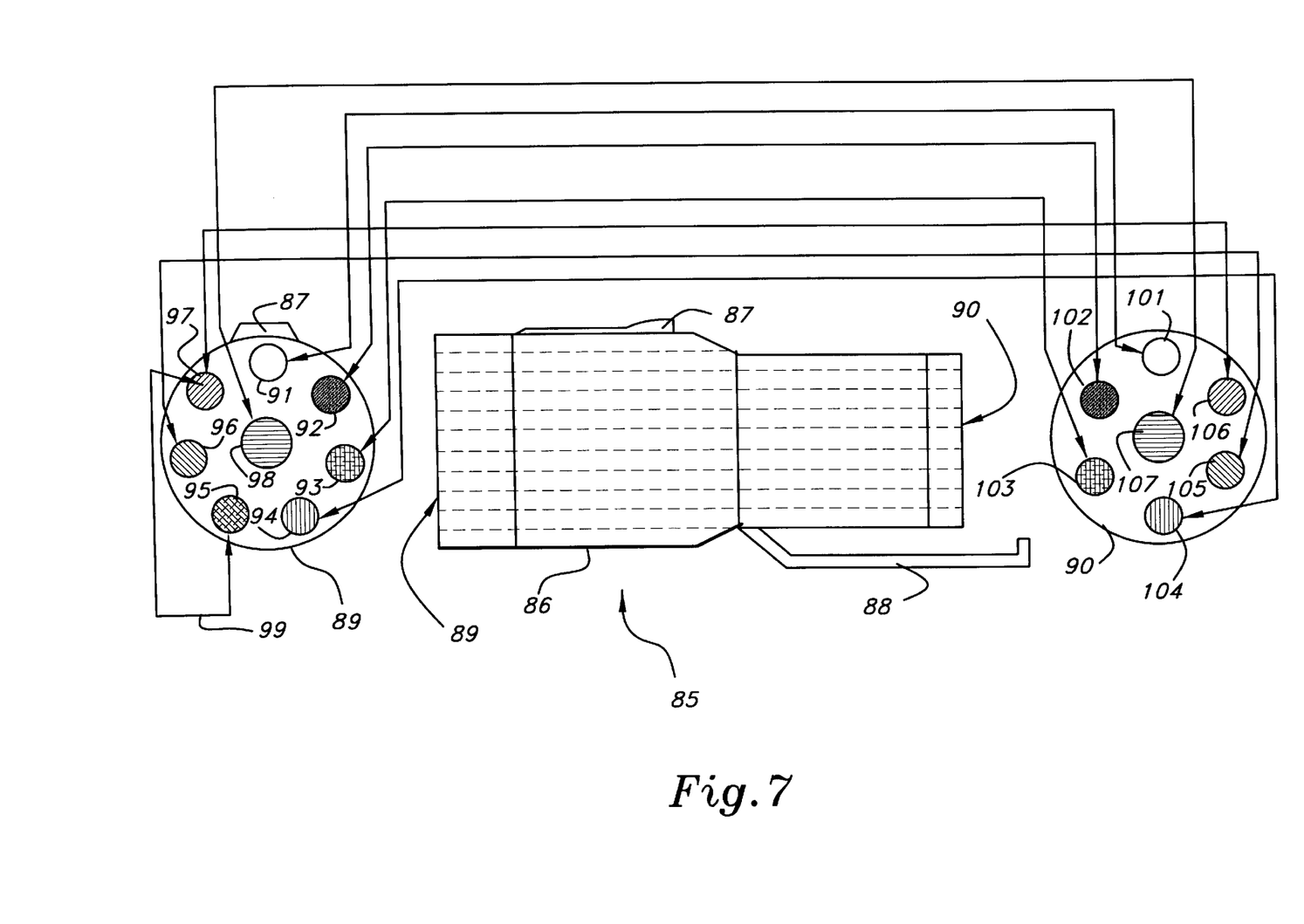
FIG. 7 is a diagrammatic side view of a first embodiment of an adaptor, flanked by end views of opposing pin connections, and a schematic diagram of the internal wiring of the adaptor.

Referring to FIG. 7, a first embodiment of an adapter 85 is shown for use to connect a standard seven wire wiring harness currently common in the trucking industry to one of the inventive eight way connections. Such connections are useful when a tractor vehicle configured for an eight way connection member tows a trailer vehicle set up with a seven way connection or vice versa. The adapter 85 includes a housing 86, a guiding element 87, and a retaining clip 88 to cooperate with one end of a wiring harness that includes a guiding element similar to guiding element 87. The adaptor housing 86 is provided with a female receptacle having eight female electrical terminals at interface 89 and a male plug having seven male electrical terminals at interface 90.

The female electrical terminals 95 and 97 of the eight way connection member interface 89 are electrically connected by a jumper wire 99, as shown by the internal wiring diagram of adapter 85, illustrated in FIG. 7. The adaptor 85 is wired internally so that terminals 95 and 97 of the eight way connection are both on the same circuit, splitting the circuit from terminal 106 of the seven way connection. Thus the internal jumper wire 99 electrically interconnects two of the electrical terminals in the eight way connection member interface 89.

Figure 8:
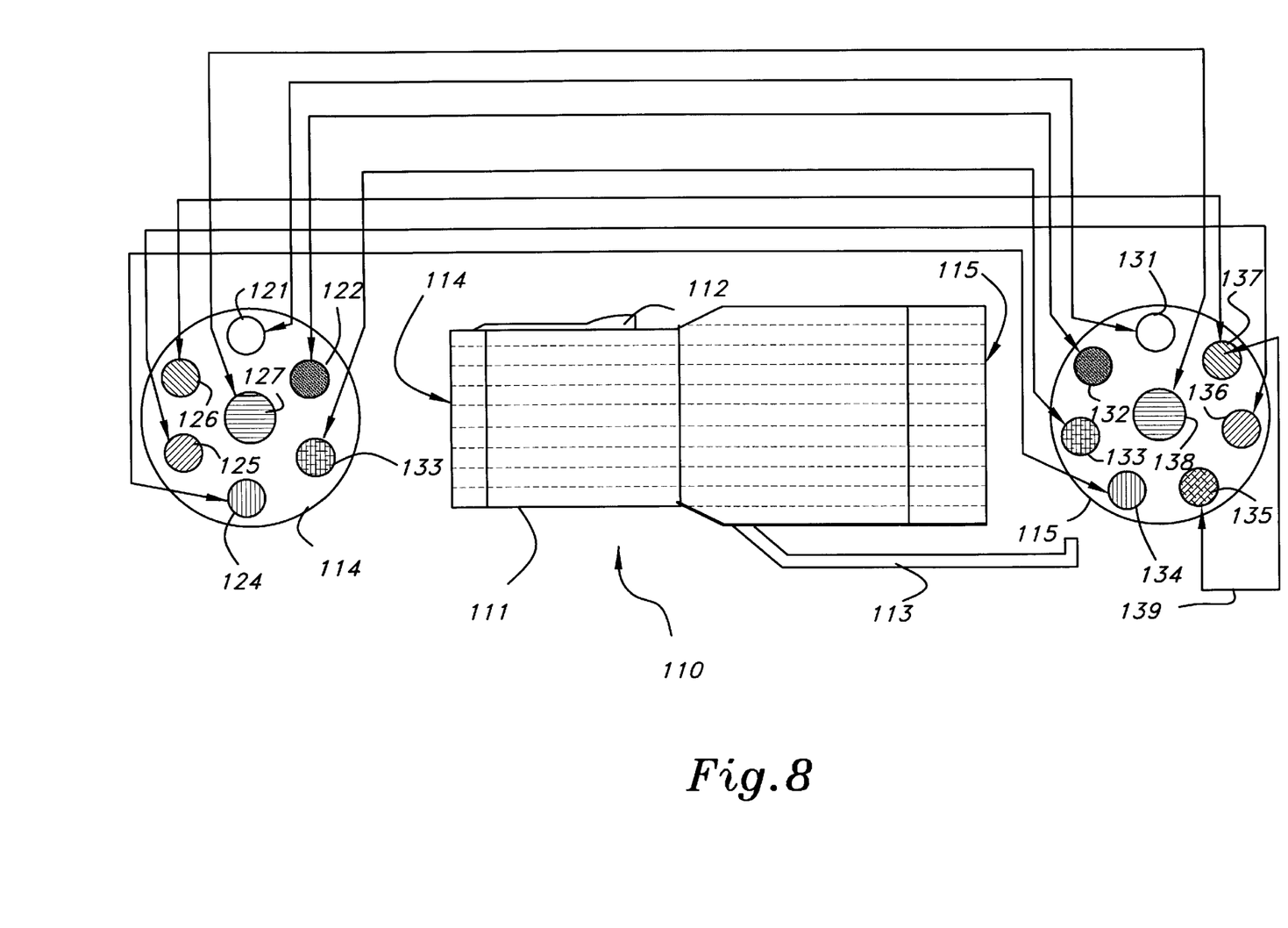
FIG. 8 is a diagrammatic side view of a second embodiment of an adaptor, flanked by end views of opposing pin connections, and a schematic diagram of the internal wiring of the adaptor.

Referring to FIG. 8, a second embodiment of an adapter 110 is shown for use to connect an eight wire wiring harness to a standard seven way connection member (not shown). The adapter 110 includes a housing 111, a guiding element 112, and a retaining clip 113 to cooperate with a cable end of a wiring harness that includes a guiding element similar to guiding element 112. The adaptor housing 111 is provided with a female receptacle having seven female electrical terminals 121–127 at interface 114 and a male plug having eight male electrical terminals 131–138 at interface 115.

The male electrical terminals 135 and 137 of the eight way connection member interface 115 are electrically connected by a jumper wire 139, as shown by the internal wiring diagram of adapter 110, illustrated in FIG. 8. The adaptor 110 is wired internally so that electrical terminals 135 and 137 of the eight way connection are both on the same circuit, splitting the circuit from female electrical terminal 126 of the seven way connection. Thus the internal jumper wire 139 electrically connects the circuits of two of the electrical terminals in the eight way connector.

It is to be understood that the present invention is not limited to the embodiments described above, but encompasses any and all embodiments within the scope of the following claims.

We claim:

1. An electrical coupling system for electrically interconnecting a tractor vehicle and a trailer vehicle each having a wiring system, the electrical coupling system comprising:

a) a tractor plate fixably connected to the tractor vehicle, said tractor plate having only eight male electrical terminals electrically connected to electrical circuits forming the wiring system of the tractor vehicle, wherein said eight tractor plate male electrical terminals are configured in the form of a central male electrical terminal circularly surrounded by seven radially disposed and equidistantly spaced male electrical terminals;

b) a trailer plate fixably connected to the trailer vehicle, said trailer plate having only eight male electrical terminals electrically connected to electrical circuits forming the wiring system of the trailer vehicle, wherein said eight tractor plate male electrical terminals are configured in the form of a central male electrical terminal circularly surrounded by seven radially disposed and equidistantly spaced male electrical terminals; and c) a wiring harness having only eight wires for removably and electrically interconnecting the tractor plate and the trailer plate; and d) an electrical coupling system adapter for enabling the electrical interconnection of the tractor plate fixably connected to the tractor vehicle that has only eight male electrical terminals with a trailer plate fixably connected to a trailer that has only seven electrical terminals via the wiring harness having only eight wires.

2. An electrical coupling system adapter for electrically interconnecting wiring systems of a tractor vehicle and a trailer vehicle comprising:

a) a seven-way receiving end with a seven-way connector having a central electrical terminal surrounded circularly by only six radially disposed equidistant electrical terminals;

b) an eight-way receiving end with an eight-way connector having a central electrical terminal surrounded circularly by only seven radially disposed equidistant electrical terminals; and c) an internal jumper electrically interconnecting two of the seven radially disposed electrical terminals in the eight-way connector.

3. The electrical coupling system adapter according to claim 2 wherein the electrical terminals in the seven-way connector are female receiving jacks and the electrical terminals in the eight-way connector are male plugs.

4. The electrical coupling system adapter according to claim 2 wherein the electrical terminals in the seven-way connector are male plugs and the electrical terminals in the seven-way connector are female receiving jacks.

5. An electrical coupling system for electrically interconnecting a tractor vehicle and a trailer vehicle each having a wiring system, the electrical coupling system comprising:

a) a tractor plate fixably connected to the tractor vehicle, said tractor plate having only eight male electrical terminals electrically connected to electrical circuits forming the wiring system of the tractor vehicle; wherein said eight trailer plate male electrical terminals are configured in the form of a central male electrical terminal circularly surrounded by seven radially disposed and equidistantly spaced male electrical terminals;

b) a trailer plate fixably connected to the trailer vehicle, said trailer plate having only seven male electrical terminals electrically connected to electrical circuits forming the wiring system of the trailer vehicle; wherein said seven trailer plate male electrical terminals are configured in the form of a central male electrical terminal circularly surrounded by six radially disposed and equidistantly spaced male electrical terminals;

c) a wiring harness having only eight wires and two ends with female receptacles for removably and electrically interconnecting the tractor plate and the trailer plate; and d) an electrical coupling system adapter for enabling the electrical interconnection of the tractor plate fixably connected to the tractor vehicle that has only eight male electrical terminals with the trailer plate fixably connected to the trailer that has only seven electrical terminals via the wiring harness having only eight wires.

6. The electrical coupling system according to claim 5 wherein the electrical terminals in the seven-way connector are female receiving jacks and the electrical terminals in the eight-way connector are male plugs.

* * * * *